US012738727B2

(12) United States Patent
Wong

(10) Patent No.: US 12,738,727 B2
(45) Date of Patent: Sep. 15, 2026

(54) ELECTRONIC FUSE CIRCUIT AND CIRCUIT SYSTEM USING THE SAME

(71) Applicant: Joulwatt Technology Co., Ltd., Hangzhou (CN)

(72) Inventor: Pitleong Wong, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 134 days.

(21) Appl. No.: 18/584,369

(22) Filed: Feb. 22, 2024

(65) Prior Publication Data

US 2024/0291264 A1 Aug. 29, 2024

(30) Foreign Application Priority Data

Feb. 23, 2023 (CN) ........................ 202310152389.0

(51) Int. Cl.

*H02H 3/20* (2006.01)
*H02H 3/087* (2006.01)
*H02H 7/12* (2006.01)

(52) U.S. Cl.

CPC ............ *H02H 3/202* (2013.01); *H02H 3/087* (2013.01); *H02H 7/12* (2013.01)

(58) Field of Classification Search

CPC ............................... H02H 3/087; H02H 3/202
See application file for complete search history.

(56) References Cited

U.S. PATENT DOCUMENTS

2013/0166947 A1* 6/2013 Yang ..................... H02M 3/156 714/E11.054
2018/0069394 A1* 3/2018 Hagen .................... H02H 9/025
2022/0060011 A1* 2/2022 Yousef ...................... H03K 5/24
2024/0404765 A1* 12/2024 Tannhäuser ............ H01H 9/548
2025/0054719 A1* 2/2025 Bierwirth ................. H02H 3/08

FOREIGN PATENT DOCUMENTS

CN 101632215 A 1/2010
CN 104065028 A 9/2014

* cited by examiner

*Primary Examiner* — Thienvu V Tran
*Assistant Examiner* — Christopher J Clark
(74) *Attorney, Agent, or Firm* — IPro, PLLC

(57) ABSTRACT

The present application discloses an electronic fuse circuit and a circuit system using the same. During startup operation, the circuit system using the electronic fuse circuit of the present application detects an amplitude of the load voltage by a second protection circuit, when the voltage exceeds a set second threshold signal, the electronic fuse circuit is controlled to be turned off; during normal operation, a current of a path where the electronic switch is located is monitored by a first protection circuit to prevent a current of the circuit system from overcurrent. According to the technical solution of the present disclosure, the load can be prevented from damage caused by a failure such as short circuit and electricity leakage of the switch power supply, and the system can be protected from overcurrent.

12 Claims, 3 Drawing Sheets

ELECTRONIC FUSE CIRCUIT AND CIRCUIT SYSTEM USING THE SAME

CROSS-REFERENCE TO RELATED APPLICATION

This application claims priority to a Chinese patent application No. 202310152389.0, which is filed on Feb. 23, 2023, published as CN115882421A on Mar. 31, 2023, and entitled "ELECTRONIC FUSE CIRCUIT AND CIRCUIT SYSTEM USING THE SAME", the entire contents of which are incorporated by reference in its entirety.

FIELD

The present application relates to a technical field of power electronics, more particularly, to an electronic fuse circuit and a circuit system using the same.

BACKGROUND

In a circuit system with electrical apparatuses, a fuse is an indispensable protection device; traditional fusible fuses need to be replaced once triggered to melt, and they are gradually replaced by electronic fuses. Electronic fuse (efuse for short) is a safety device that includes an electronic switch. It can resume operation after a failure is resolved, and the circuit system can be protected and unprotected by controlling the electronic switch to be turned on and off.

As shown in FIG. 1, a traditional efuse circuit comprises an electronic switch and a switch control circuit for controlling the electronic switch to be turned on and off, and it is mainly used for overcurrent protection of a circuit system, and its control solution is generally achieved by monitoring an amplitude of a current flowing through a path where the electronic switch is located, the electronic switch is controlled to be turned off when the current amplitude exceeds an overcurrent protection reference value, and the electronic switch is controlled to be turned on when the current amplitude is smaller than the overcurrent protection reference value.

However, in some application scenarios, e.g., in a circuit system with a switch power supply, as shown in FIG. 1, the switch power supply is connected between the efuse and the application load, during an operation process of the circuit, e.g., in a startup operation, if leakage or short circuit occurs in the switch power supply, the load will withstand a certain voltage before startup; when the system enters normal operation, the efuse is turned on, and an input electric signal is applied to the load after being converted by the switch power supply, here the voltage withstood by the load has the risk of being excessive, which may damage the load; during a normal power supply operation, if leakage or short circuit occurs in the switch power supply, the load will also withstand an excessive voltage, which may damage the load.

Therefore, it is necessary to provide an improved technical solution to overcome the above technical problems in the prior art.

SUMMARY

In view of this, an objective of the present disclosure is to provide an electronic fuse circuit and a circuit system using the same, to resolve a technical problem in the prior art of load damaging caused by a failure, such as electrical leakage, short circuit of a switch power supply, etc.

In a first aspect, the present application provides an electronic fuse circuit used in a circuit system with a switch power supply, the switch power supply is configured to supply power to a load, wherein the electronic fuse circuit comprises: an electronic switch, coupled to a transmission terminal of an input power supply and an input terminal of the switch power supply, respectively through a corresponding wire, the electronic switch being configured to connect or disconnect the transmission terminal of the input power supply with the input terminal of the switch power supply according to a switch control signal; a first protection circuit, configured to obtain a first protection signal according to a first threshold signal and a current sense signal representing a current of a path where the electronic switch is located; a second protection circuit, configured to obtain a second protection signal according to a second threshold signal and a voltage sense signal representing a load voltage, wherein the second protection circuit is connected to an output terminal of the switch power supply or an input terminal of the load to obtain the voltage sense signal representing the load voltage, a logic circuit, configured to generate the switch control signal for controlling the electronic switch to be turned on and off according to the first protection signal and the second protection signal, wherein when the current sense signal reaches the first threshold signal or the voltage sense signal reaches the second threshold signal, the logic circuit is configured to generate the switch control signal for controlling the electronic switch to be turned on and off.

In some optional embodiments, under different operation states of the circuit system, a value of the second threshold signal is set differently.

In some optional embodiments, the value of the second threshold signal under a startup operation state is smaller than the value of the second threshold signal under a normal operation state.

In some optional embodiments, the first protection circuit is configured to provide the first protection signal in valid state to indicate that the electronic switch is turned off, when the current sense signal reaches the first threshold signal; the second protection circuit is configured to provide the second protection signal in valid state to indicate that the electronic switch is turned off, when the current sense signal reaches the second threshold signal.

In some optional embodiments, the logic circuit is configured to, during an operation process of the circuit system, if the first protection signal is in valid state, control the switch control signal to be in invalid state to control the electronic switch to be turned off, or if the second protection signal is in valid state, control the switch control signal to be in invalid state to control the electronic switch to be turned off.

In some optional embodiments, the logic circuit is configured to, during a startup operation of the circuit system, if the second protection signal is in valid state, control the switch control signal to be in invalid state to control the electronic switch to be turned off.

In some optional embodiments, the first protection circuit comprises a first comparison circuit, which obtains the first protection signal when receiving the current sense signal and the first threshold signal; the second protection circuit comprises a second comparison circuit, which obtains the second protection signal when receiving the current sense signal and the second threshold signal.

In some optional embodiments, the logic circuit comprises an OR logic and a trigger circuit; the OR logic receives the first protection signal and the second protection signal, and the output terminal of the OR logic outputs a first logic signal; a reset terminal of the trigger circuit receives the first logic signal, a set terminal of the trigger circuit receives a turning-on signal to control the electronic switch to be turned on, and an output terminal of the trigger circuit outputs the switch control signal to control the electronic switch.

In some optional embodiments, the logic circuit comprises a first trigger circuit, a second trigger circuit, and a NOR logic; a set terminal of the first trigger circuit receives the first protection signal, and a reset terminal of the first trigger circuit receives a first turning-on signal, so that the first trigger circuit outputs a first logic signal, a set terminal of the second trigger circuit receives the second protection signal, and a reset terminal of the second trigger circuit receives a second turning-on signal, so that the second trigger circuit outputs a second logic signal; the NOR logic receives the first logic signal and the second logic signal, and an output terminal of the NOR logic outputs the switch control signal.

According to a second aspect, there is provided a circuit system with an electronic fuse circuit, wherein the circuit system comprises a switch power supply, and the switch power supply receives an input power supply voltage through the electronic fuse circuit according to any embodiment of the present disclosure and converts the input power supply voltage into an output electric signal to drive the load.

In some optional embodiments, the switch power supply is a buck-type switch power supply.

In some optional embodiments, the switch power supply is a multi-phase buck-type switch power supply; the multi-phase switch power supply comprises a driving control circuit and a multi-phase power stage circuit; when the current sense signal reaches the first threshold signal or the voltage sense signal reaches the second threshold signal, both of the driving control circuit and the multi-phase power stage circuit do not work.

By using the electronic fuse circuit structure and the circuit system using the electronic fuse circuit structure according to embodiments of the present application, during a startup operation or a normal operation, an amplitude of a load voltage is detected by a second comparison circuit; when the voltage exceeds a set second threshold voltage, the electronic fuse circuit is controlled to be turned off; if the detected signal does not exceed the set second threshold signal, the electronic fuse circuit is controlled to be turned on; a current of a path in the system will be prevented from overcurrent by monitoring the current of the path where the electronic switch is located, by a first comparison circuit. By using the technical solution according to embodiments of the present disclosure, the load can be prevented from damage caused by a failure such as short circuit and leakage of the switch power supply, and overcurrent event of the system can be avoided.

BRIEF DESCRIPTION OF THE DRAWINGS

The above and other objects, features and advantages of the present invention will become more apparent from the description below with reference to the accompanying drawings.

DETAILED DESCRIPTION

Preferred embodiments of the present disclosure are described in detail below with reference to the accompanying drawings but the present disclosure is not limited to these embodiments. The present disclosure is intended to cover alternatives, modifications, equivalents, and arrangements that are within the spirit and scope of the present disclosure.

In order to provide a thorough understanding of the present disclosure, specific details are set forth in the following descriptions of the preferred embodiments of the present disclosure, and the present disclosure may be fully understood by those skilled in the art without such details.

The present disclosure is described in more detail by way of example in the following paragraphs with reference to the accompanying drawings. It should be noted that the drawings are all in a simplified form and are not precisely drawn to scale, the drawings are only provided to aid in describing the embodiments of the present disclosure conveniently and clearly.

Figure 1:
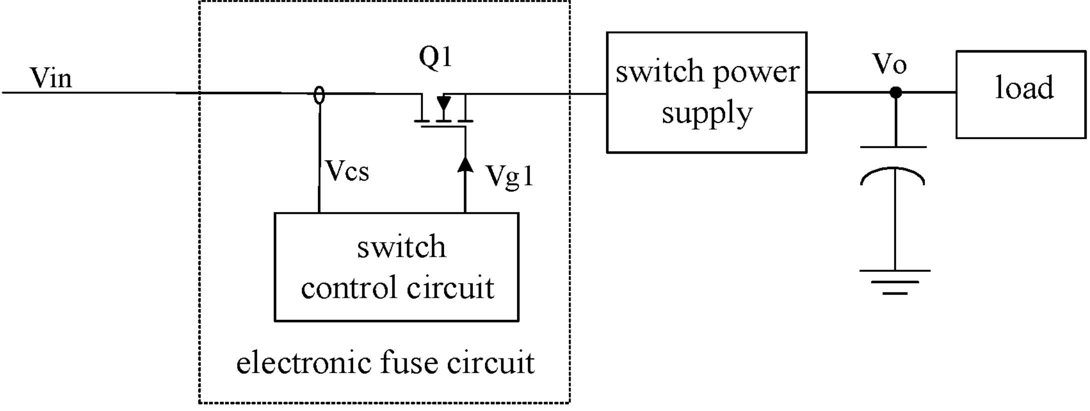
FIG. 1 is a circuit diagram of a circuit system with an electronic fuse according to the prior art.
Figure 2:
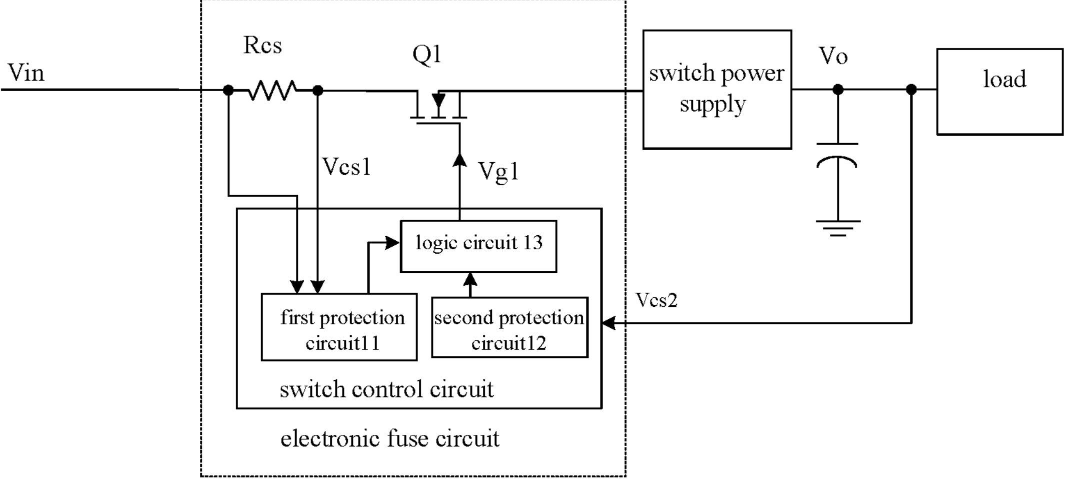
FIG. 2 is a circuit diagram of a circuit system including an electronic fuse circuit according to an embodiment of the present disclosure.
Figure 3:
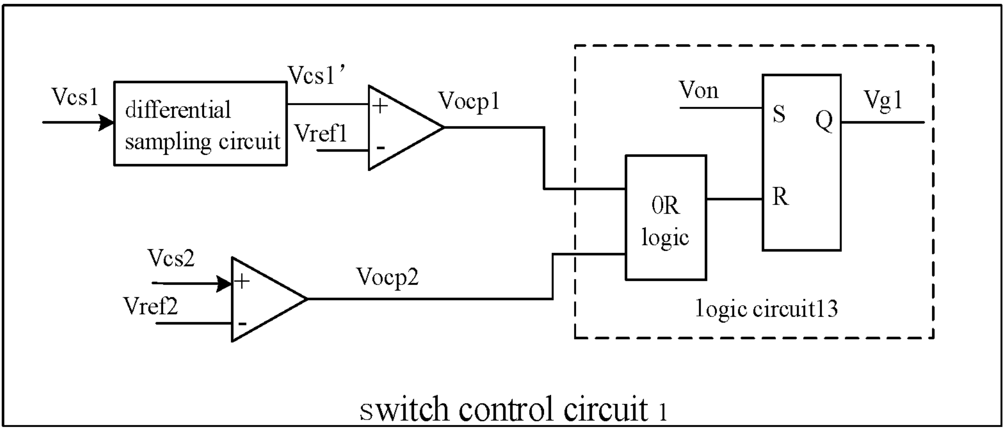
FIG. 3 is a specific circuit diagram of a switch control circuit according to a first embodiment of the present disclosure.
Figure 4:
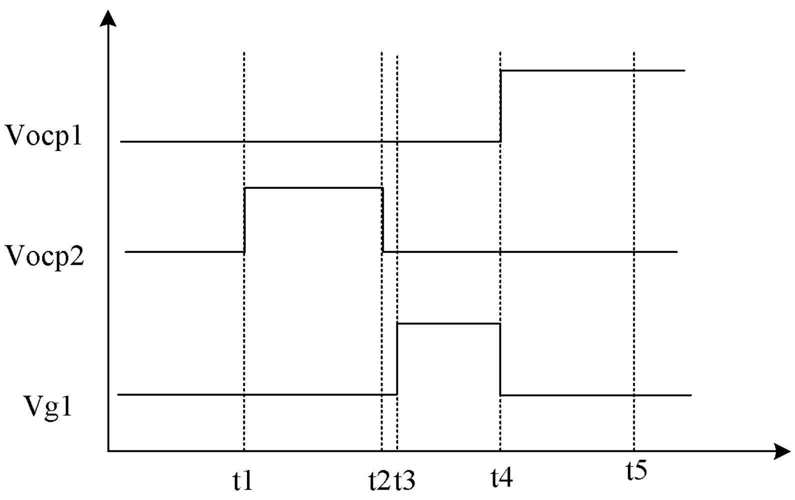
FIG. 4 is an operation waveform diagram of signals showing in FIG. 3.

FIG. 2 is a circuit diagram of a circuit system with an electronic fuse according to an embodiment of the present disclosure; FIG. 3 is a specific circuit diagram of a switch control circuit according to a first embodiment of the present disclosure; FIG. 4 is an operation waveform diagram of signals according to FIG. 3. The circuit system in embodiments of the present disclosure comprises a switch power supply, and the switch power supply receives a signal of an input power supply through the electronic fuse circuit; the input power supply may be a DC power supply, and the signal of the input power supply may be a DC voltage signal, the switch power supply is configured to convert the signal of the input power supply into an output electric signal for driving a load, and the output electric signal may be a DC voltage signal.

In an example as shown in FIG. 2, the electronic fuse circuit comprises an electronic switch Q1 and a switch control circuit 1 controlling the electronic switch to be turned on and off; the switch control circuit 1 generates a switch control signal Vg1, and the switch control signal Vg1 is configured to connect or disconnect a transmission terminal for signal input with an input terminal of the switch power supply. The electronic switch Q1 denotes a switch or a circuit system comprising a switch. The electronic switch comprises at least one transistor, and the at least one transistor may be MOSFET (metal oxide semiconductor field effect transistor), IGBT (insulated gate bipolar transistor), JFET (junction field-effect transistor), BJT (bipolar junction transistor) or other switch transistor that can implement equivalent functions.

In an embodiment, the switch control circuit 1 comprises a first protection circuit 11, a second protection circuit 12, and a logic circuit 13; the first protection circuit 11 obtains a first protection signal Vocp1 according to a first threshold signal Vref1 and a current sense signal Vcs1 representing a current of a path where the electronic switch is located; the second protection circuit 12 obtains a second protection signal Vocp2 according to a second threshold signal Vref2 and a voltage sense signal Vcs2 representing a load voltage; the logic circuit 13 is configured to generate the switch control signal Vg1 to control the electronic switch to be turned on and off according to the first protection signal Vcop1 and the second protection signal Vcop2. Here, the current sense signal Vcs1 may be obtained by using a resistor device such as a resistor Rcs, and may represent an amplitude of the current of the path where the electronic switch is located (e.g., the current sense signal Vcs1 may be in certain proportion to the current), and the first threshold signal Vref1 is an overcurrent protection threshold of the system; the voltage sense signal Vcs2 may be obtained by use of a voltage detection device, e.g., a voltage-division resistor, which may be connected to the output terminal of the switch power supply or the input terminal of the load to obtain a signal representing the load voltage; the voltage sense signal Vcs2 may be in certain proportion to the load voltage, and the second threshold signal Vref2 is a set over-voltage protection threshold. It needs to explain that when the circuit system is operated under different operation states, a value of the second threshold signal may be set differently; the value of the second threshold signal under startup operation state is smaller than the value of the second threshold signal under normal operation state, and an amplitude of the second threshold signal may be set flexibly according to a normal operating voltage of the load.

In this embodiment, the first protection circuit is configured to, when the current sense signal reaches the first threshold signal, provide the first protection signal in valid state to indicate that the electronic switch is turned off, and the second protection circuit is configured to, when the voltage sense signal reaches the second threshold signal, provide the second protection signal in valid state to indicate that the electronic switch is turned off. However, the relationship of the states of the first protection signal and the second protection signal and the on/off states of the electronic switch is not restricted to this, and in this example, the invention principles are presented merely for convenience.

As an example, the electronic switch can be turned on according to a turning-on indication signal; for example, after the electronic switch is turned off and a certain-time delay, the electronic switch is controlled to be turned on according to a clock signal.

Referring to FIG. 3, a specific circuit diagram of the switch control circuit according to the first embodiment of the present disclosure is shown. The first protection circuit comprises a first comparison circuit which obtains the first protection signal when receiving the current sense signal and the first threshold signal; here, the first comparison circuit comprises a differential sampling circuit and a comparator, and the differential sampling circuit samples a voltage across two ends of the sampling resistor Rcs to obtain the current sense signal Vcs1' representing a path current; a non-inverting input terminal of the comparator receives Vcs1', and an inverting input terminal of the comparator receives the first threshold signal Vref1; an output terminal of the comparator outputs the first protection signal Vocp1; when the current sense signal reaches the first threshold signal, the first protection signal jumps to valid state at high voltage level; the second protection circuit comprises a second comparison circuit; the second comparison circuit comprises a comparator, which receives the voltage sense signal Vcs2 and the second threshold signal Vref2, to obtain the second protection signal Vocp2.

Referring to FIG. 3, the logic circuit comprises an OR logic and a trigger circuit; the trigger circuit comprises an RS trigger, and the OR logic receives the first protection signal Vocp1 and the second protection signal Vocp2; an output terminal of the OR logic outputs a first logic signal; a reset terminal of the trigger circuit receives the first logic signal; a set terminal of the trigger circuit receives a turning-on signal to control the electronic switch to be turned on; an output terminal of the trigger circuit outputs the switch control signal Vg1 to control the electronic switch. Here, the operation process of FIG. 3 can be illustrated by combining with the waveform diagram shown in FIG. 4; for example, in the startup operation of the circuit system, at time t1, the first protection circuit detects that the current sense signal is smaller than the first threshold signal, and the first protection signal Vocp1 is in invalid state at low voltage level; the second protection circuit detects that the voltage sense signal reaches or exceeds the second threshold signal, and the second protection signal Vocp2 is in invalid state at high voltage level; here, the OR gate outputs a high-level voltage, and the reset terminal of the RS trigger is at high voltage level, the output switch control signal Vg1 is in invalid state at low voltage level, and the electronic switch is turned off; until time t2, when the second protection circuit detects that the voltage sense signal is lower than the second threshold signal, the second protection signal Vocp2 is in invalid state at low voltage level, and the OR gate outputs a low-level voltage; after a period of delay, e.g., at time 3, the set terminal of the RS trigger receives the turning-on signal Von to control the electronic switch to be turned on, and the switch control signal Vg1 output by the RS trigger is in valid state at high voltage level, and the electronic switch is turned on. When the system enters into the normal operation state, e.g., at time t4, the first protection circuit detects that the current sense signal reaches or exceeds the first threshold signal, the first protection signal Vocp1 is in valid state at high voltage level, the OR gate outputs high-level voltage, and the reset terminal of the RS trigger is at high voltage level; the output switch control signal Vg1 is in invalid state at low voltage level, and the electronic switch is turned off. If in the normal operation of the circuit system, the second protection circuit detects that the voltage sense signal reaches or exceeds the second threshold signal, the second protection signal Vocp2 changes to valid state at high voltage level, and according to the above process, the switch control signal Vg1 output by the RS trigger is in invalid state at low voltage level, and the electronic switch is turned off. Therefore, in an entire operation of the system, event protection of current and voltage can be well performed by the two protection circuits.

Figure 5:
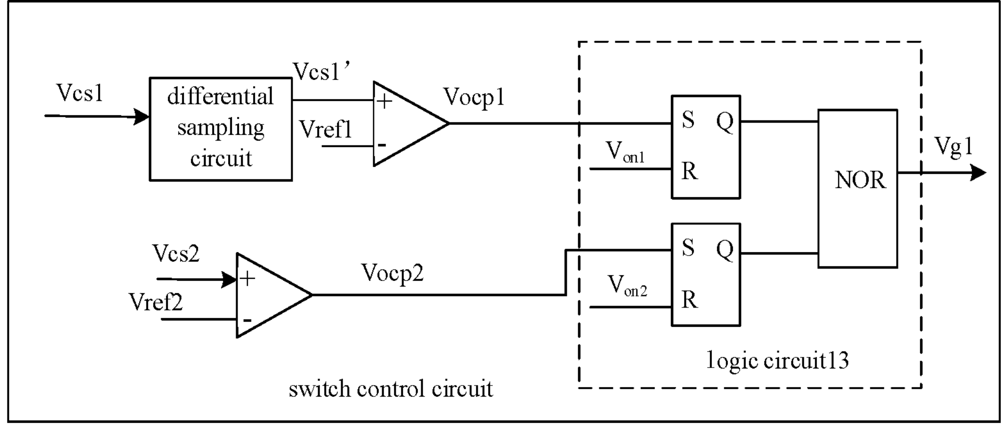
FIG. 5 is a specific circuit diagram of a switch control circuit according to a second embodiment of the present disclosure.

Referring to FIG. 5, a second specific circuit diagram according to the second embodiment of the switch control circuit of the present disclosure is shown; the logic circuit comprises a first trigger circuit (e.g., a first RS trigger), a second trigger circuit (e.g., a second RS trigger) and a NOR logic; a set terminal of the first RS trigger receives the first protection signal Vocp1, and a reset terminal of the first RS trigger receives a first turning-on signal Von1, so that the first RS trigger can output a first logic signal accordingly; a set terminal of the second RS trigger receives the second protection signal Vocp2, and a reset terminal of the second RS trigger receives a second turning-on signal Von2, so that the second RS trigger can output a second logic signal accordingly; the NOR logic receives the first logic signal and the second logic signal, and an output terminal of the NOR logic outputs the switch control signal Vg1. Here, the first turning-on signal Von1 and the second turning-on signal Von2 may be the same signal or different signals. When the second protection circuit detects that the voltage sense signal reaches or exceeds the second threshold signal, the second protection signal Vocp2 is in invalid state at high voltage level, and the second RS trigger outputs a high-level voltage; after passing through the NOR gate, the switch control signal Vg1 is in invalid state at low voltage level, and the electronic switch is turned off; then after a period of delay, the switch control signal Vg1 is controlled to be in valid state at high voltage level by the second turning-on signal Von2, and the electronic switch is turned on; for the same reason, when the first protection circuit detects that the current sense signal reaches or exceeds the first threshold signal, the first protection signal Vocp1 is in valid state at high voltage level, and the first RS trigger outputs a high-level voltage; after passing through the NOR gate, the switch control signal Vg1 is in invalid state at low voltage level, and the electronic switch is turned off. Therefore, when the current sense signal reaches the first threshold signal or the voltage sense signal reaches the second threshold signal, the electronic switch is turned off. Those skilled in the art know that here there are many implementation manners for the logic circuit, e.g., by way of switch combination, and an objective is to control the switch control signal Vg1 to be in invalid state at low voltage level when the first protection signal Vocp1 is in valid state at high voltage level or the second protection signal Vocp2 is in valid state at high voltage level, and the electronic switch is turned off; the achieved protection effects are the same.

Figure 6:
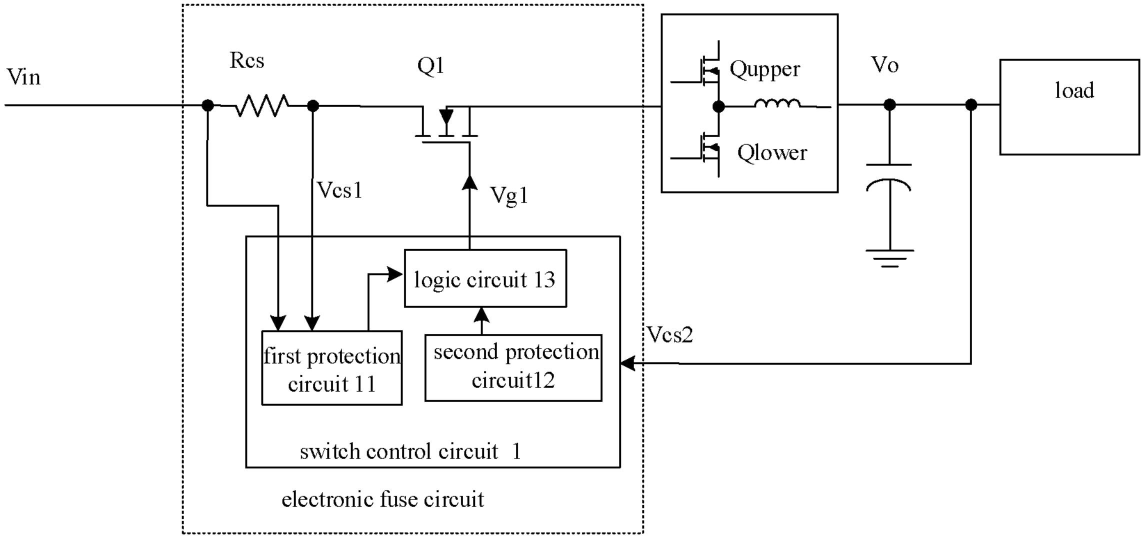
FIG. 6 is a schematic view of an application scenario of an electronic fuse according to an embodiment of the present disclosure.

Referring to FIG. 6, a schematic view of an application scenario of the electronic fuse circuit according to an embodiment of the present disclosure. The switch power supply is a buck-type type switch power supply, comprising two switch transistors (an upper one Qupper and a lower one Qlower) and an inductor. If there is leakage in the switch transistor (e.g., the upper power transistor Qupper) of the switch power supply, a voltage will be applied to the input terminal of the load; if the voltage is big, during startup operation or normal operation, a total value of the voltage exceeds a withstanding range of the load, and this will damage the load; by using the protection solution according to the embodiments of the present disclosure, the problem can be well solved by monitoring the voltage at the input terminal of the load.

As an example, the switch power supply is a multi-phase buck-type switch power supply, and the multi-phase switch power supply comprises a driving control circuit and a multi-phase power stage circuit; when the current sense signal reaches the first threshold signal or the voltage sense signal reaches the second threshold signal, the driving control circuit and the multi-phase power stage circuit do not work, and this can protect the load from being damaged.

Optionally, the electronic fuse circuit can be set on the same integrated chip, and it can also be set on the same integrated chip with all or part of the circuits in the switch power supply. For example, all or part of the circuits in the switch control unit of the electronic fuse circuit and part of the circuits of the control circuit of the switch power supply can be set on the same integrated chip. The embodiments of the present application are not limited to this.

By the technical solutions according to embodiments of the present disclosure, during a startup operation or a normal operation, an amplitude of a voltage at the input terminal of the load is detected by the second protection circuit; when the detected signal exceeds a set second threshold signal, the electronic fuse circuit is controlled to be turned off; if the detected signal does not exceed the set second threshold signal, the electronic fuse circuit is controlled to be turned on. When it is maintained that an original overcurrent current protection function of the electronic fuse does not change, it is very important to increase the overvoltage protection of the load in some scenarios; for example, when the load (e.g., a CPU load) is expensive and not easy to change, under startup operation or normal operation, once the voltage applied on the load is too large, the electronic fuse can be disconnected immediately by a feedback loop, which can prevent the load from being damaged.

The above embodiments do not form restriction on the protection scope of the technical solution. Any amendments, equivalent replacements, and improvements made within the sprits and scopes of the above embodiments shall fall in the protection scopes of the technical solutions.

The invention claimed is:

1. An electronic fuse circuit used in a circuit system with a switching power supply, the switching power supply being for supplying power to a load, wherein the electronic fuse circuit comprises:

an electronic switch, coupled to a transmission terminal of an input power supply and an input terminal of the switching power supply, respectively through a corresponding wire, the electronic switch being configured to connect or disconnect the transmission terminal of the input power supply with the input terminal of the switching power supply according to a switch control signal;

a first protection circuit, configured to obtain a first protection signal according to a first threshold signal and a current sense signal representing a current of a path where the electronic switch is located;

a second protection circuit, configured to obtain a second protection signal according to a second threshold signal and a voltage sense signal representing a load voltage, wherein the second protection circuit is connected to an output terminal of the switching power supply or an input terminal of the load to obtain the voltage sense signal representing the load voltage, a logic circuit, configured to generate the switch control signal for controlling the electronic switch to be turned on and off according to the first protection signal and the second protection signal, wherein the logic circuit is configured to:

during a startup operation state of the circuit system when the electronic switch is in an off state, if the first protection signal indicates that the current sense signal reaches the first threshold signal, and/or the second protection signal indicates that the voltage sense signal reaches the second threshold signal, control the switch control signal to keep the electronic switch in the off state, thereby preventing the input power supply from supplying power to the switching power supply, until the current sense signal is below the first threshold signal and the voltage sense signal is below the second threshold signal, and then after a delay, control the electronic switch to be turned on; and during a normal operation state of the circuit system after startup, if the first protection signal indicates that the current sense signal reaches the first threshold signal, and/or the second protection signal indicates that the voltage sense signal reaches the second threshold signal, control the switch control signal to switch the electronic switch from an on state to the off state.

2. The electronic fuse circuit according to claim 1, wherein under different operation states of the circuit system, a value of the second threshold signal is set differently.

3. The electronic fuse circuit according to claim 2, wherein the value of the second threshold signal under the startup operation state is smaller than the value of the second threshold signal under the normal operation state.

4. The electronic fuse circuit according to claim 1, wherein, the first protection circuit is configured to provide the first protection signal in valid state so that the electronic switch is turned off, when the current sense signal reaches the first threshold signal;

the second protection circuit is configured to provide the second protection signal in valid state so that the electronic switch is turned off, when the voltage sense signal reaches the second threshold signal.

5. The electronic fuse circuit according to claim 4, wherein the logic circuit is configured to, during an operation process of the circuit system, if the first protection signal is in valid state, control the switch control signal to be in invalid state to control the electronic switch to be turned off, or if the second protection signal is in valid state, control the switch control signal to be in invalid state to control the electronic switch to be turned off.

6. The electronic fuse circuit according to claim 4, wherein the logic circuit is configured to, during the startup operation state of the circuit system, if the second protection signal is in valid state, control the switch control signal to be in invalid state to control the electronic switch to be turned off.

7. The electronic fuse circuit according to claim 1, wherein, the first protection circuit comprises a first comparison circuit, which obtains the first protection signal when receiving the current sense signal and the first threshold signal;

the second protection circuit comprises a second comparison circuit, which obtains the second protection signal when receiving the voltage sense signal and the second threshold signal.

8. The electronic fuse circuit according to claim 7, wherein the logic circuit comprises an OR logic and a trigger circuit, the OR logic receives the first protection signal and the second protection signal, and an output terminal of the OR logic outputs a first logic signal, a reset terminal of the trigger circuit receives the first logic signal, a set terminal of the trigger circuit receives a turning-on signal to control the electronic switch to be turned on, and an output terminal of the trigger circuit outputs the switch control signal to control the electronic switch.

9. The electronic fuse circuit according to claim 7, wherein the logic circuit comprises a first trigger circuit, a second trigger circuit, and a NOR logic, a set terminal of the first trigger circuit receives the first protection signal, and a reset terminal of the first trigger circuit receives a first turning-on signal, so that the first trigger circuit outputs a first logic signal, a set terminal of the second trigger circuit receives the second protection signal, and a reset terminal of the second trigger circuit receives a second turning-on signal, so that the second trigger circuit outputs a second logic signal, the NOR logic receives the first logic signal and the second logic signal, and an output terminal of the NOR logic outputs the switch control signal.

10. A circuit system comprising an electronic fuse circuit according to claim 1, wherein the circuit system further comprises a switching power supply, and the switching power supply receives an input power supply voltage through the electronic fuse circuit according to claim 1 and converts the input power supply voltage into an output electric signal to drive the load.

11. The circuit system according to claim 10, wherein the switching power supply is a Buck-type switching power supply.

12. The circuit system according to claim 11, wherein the switching power supply is a multi-phase Buck-type switching power supply, the multi-phase switching power supply comprises a driving control circuit and a multi-phase power stage circuit, when the current sense signal reaches the first threshold signal or the voltage sense signal reaches the second threshold signal, both of the driving control circuit and the multi-phase power stage circuit do not work.

* * * * *